M. V. DRAKE.
CAR-STARTER.
No. 187,832.                            Patented Feb. 27, 1877.
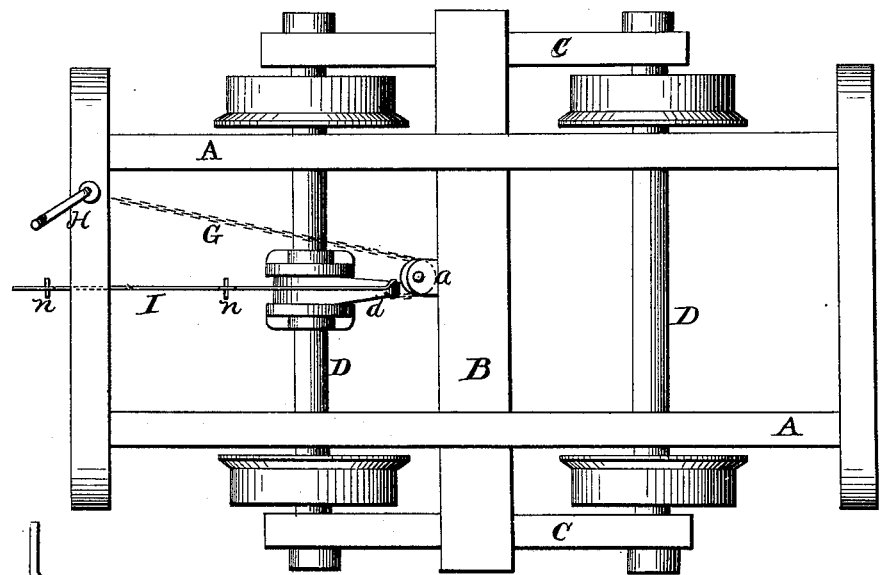
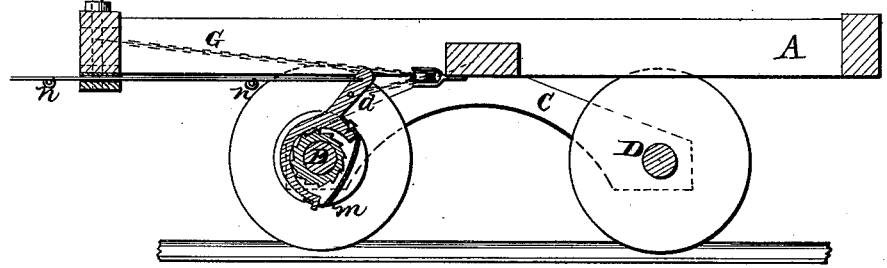
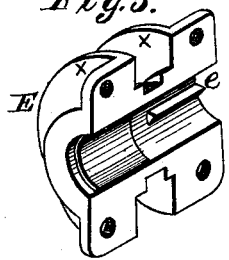
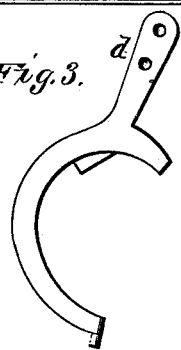
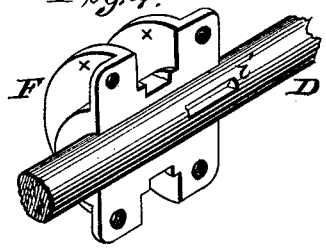
WITNESSES
Franck L. Ourand.
H. N. Miller
INVENTOR
Merritt V. Drake
Alexander Mason
ATTORNEYS.

UNITED STATES PATENT OFFICE.

MERRITT V. DRAKE, OF ATTICA, IND., ASSIGNOR OF TWO-THIRDS HIS RIGHT TO JOSEPH SHANNON NAVE AND COLUMBUS NAVE, OF SAME PLACE.

IMPROVEMENT IN CAR-STARTERS.

Specification forming part of Letters Patent No. 187,832, dated February 27, 1877; application filed February 1, 1877.

*To all whom it may concern:*

Be it known that I, MERRITT V. DRAKE, of Attica, in the county of Fountain, and in the State of Indiana, have invented certain new and useful Improvements in Street-Car Starters; and do hereby declare that the following is a full, clear, and exact description thereof, reference being had to the accompanying drawings, and to the letters of reference marked thereon, making a part of this specification.

The nature of my invention consists in the construction and arrangement of the several devices hereinafter described, for forming a starter for horse-cars, as will be set forth.

To enable those skilled in the art to make and use my invention, I will now proceed to describe its construction and operation.

In the accompanying drawings, making part of this specification, Figure 1 represents a plan view; Fig. 2, a side view, part in section; and Figs. 3, 4, and 5, views of detached portions.

In the figures, A represents the floor-frame of the car, and B a center cross-piece, upon which the frame rests. C C represent longitudinal bearing-bars, which support the cross-bar B, and which rest upon the axles outside of the frame A. D D represent the axles. The forward axle is provided with a groove near its center, as seen at $i$. E and F represent the two halves of a metallic box, which surrounds the axle at its center. The sections of the boxes are provided with flanges $e$, which are intended to fit in the grooves in the axles, to keep them securely in place. The two sections, when brought together around the axle, are securely bolted together, and form, as it were, a part of the axle. $x\ x$ represent flanges upon the box, and the metal of the box, between the flanges, is provided with ratchet-teeth. $d$ represent a lever, the upper end of which is straight, but the lower end curved to correspond with the curve of the box between the flanges $x\ x$. This lever is provided upon its concave side with one or more teeth to correspond with those upon the box, and lies in between the flanges $x$. $m$ represents a strap or bar of metal, which is fastened to the lever $d$, so as to make it surround the box and keep it in place. To the upper end of the lever $d$ is secured a draft-rod, I, or chain, which passes forward and through the front cross piece of the frame. Upon this rod, and upon different sides of the cross piece, are stops $n\ n$, which allow the rod to work only so far in either direction. To the back of the lever $d$, near its upper end, is a chain, G. This chain passes back and around a pulley, $a$, upon cross-bar B, and then forward and around the usual brake-rod.

When the car is being drawn forward the lever $d$ lies in an almost horizontal position. As soon as the car is to be checked up, the driver, by turning the brake-rod crank, raises the lever to about a vertical position, or until its teeth engage with those upon the box. When the car is to be started, it will readily be seen that the draft is from the upper end of the lever $d$ through the rod I, thus giving a great percentage of leverage. When the axle turns sufficiently to bring the lever to a horizontal position again, the teeth become disengaged, and the car moves on without connection of the parts. This arrangement makes a simple and effective starter.

Having thus fully described my invention, what I claim as new, and desire to secure by Letters Patent, is—

The combination of the forward axle, provided with groove $i$, the metallic box-sections E F, having interior flanges $e$, exterior flanges $x\ x$, and ratchet between the same, the lever $d$, strap $m$, and draft-rod I, all constructed to operate substantially as set forth.

In testimony that I claim the foregoing I have hereunto set my hand.

MERRITT VANTILE DRAKE.

Witnesses:
GEO. F. WARD,
GEORGE NAVE.